(No Model.)
A. R. LEEDS.
LACTOMETER.
No. 294,052. Patented Feb. 26, 1884.
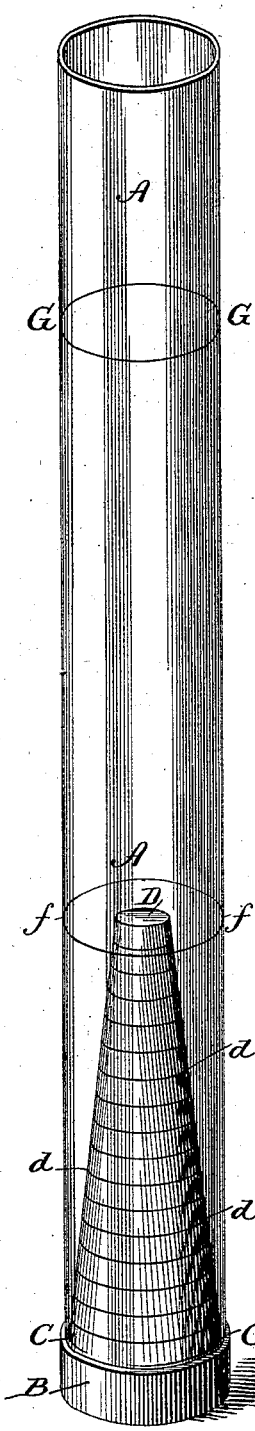
Witnesses:
H. W. Brigham,
George M. Hoffmann.
Inventor:
Albert R. Leeds
by Dill & Chandler
Attorneys

UNITED STATES PATENT OFFICE.

ALBERT R. LEEDS, OF HOBOKEN, NEW JERSEY.

LACTOMETER.

SPECIFICATION forming part of Letters Patent No. 294,052, dated February 26, 1884.

Application filed September 17, 1883. (No model.)

*To all whom it may concern:*

Be it known that I, ALBERT R. LEEDS, a citizen of the United States, residing at Hoboken, in the county of Hudson and State of New Jersey, have invented a new and Improved Butyroscope or Apparatus for Milk Inspection, of which the following is a specification.

The object of my invention is to determine the percentage of fat by the degree of transparency possessed by a mixture of an invariable-measured quantity of water with a measured quantity of the milk to be tested, the principle of the test being that the degree of transparency of the mixture decreases with the richness of the milk. I apply this test by the apparatus illustrated in the accompanying drawing, in which A A is a cylindrical glass vessel, about fifteen inches in height and one and one-half inch in internal diameter, in the lower end of which is inserted a conical-shaped stopper, B, made of any non-transparent material, with a diameter at C exactly equal to the internal diameter of the cylinder and accurately fitting the cylinder, so that the line C is upon the bottom rim of the cylinder and the top of the cone D is even with the line *f f*. The stopper B, being at the line C, gradually tapers toward the top, which is about one-half an inch in diameter, and exactly even with the line *f f*, drawn around the cylinder four and one-half inches from the bottom. Around the stopper at intervals of one-quarter or other suitable fraction of an inch are drawn black lines *d d d d d* parallel to *c c c*.

The method of using the butyroscope is as follows: Pour into the cylinder a measured quantity of milk, and then an invariable quantity of water, measured most conveniently by a line on the cylinder. After thorougly shaking the mixture the quantity of butter or cream can be estimated from the number of black lines visible on the cone. The less cream there is in the milk the more translucent will be the liquid, and consequently the greater will be the number of black lines visible on the cone.

Instead of using a cylindrical vessel and conical stopper, by means of which the test may be made from any side, I can also use a vessel with flat sides, and opposite one or more of said sides can be placed the non-transparent gage inclined at any convenient angle, and having upon it the black lines, as above described, placed at regular intervals.

The butyroscope can further be used as a receptacle for milk while testing it with the lactometer, its height being ample to admit of reading the specific gravity with that instrument.

I am aware that there is an instrument called "Feser's lactroscope" patented in Germany, which is designed for the determination of cream or butter in milk by diluting milk with water until black lines are visible; but the principle in my invention is entirely different. The method of determining the butter in milk by Feser's lactroscope is to add successive measured quantities of water to a measured quantity of milk in a glass cylinder until black lines drawn on a cylindrical non-tapering stopper are just visible. The principle in my instrument consists in the use of an invariable quantity of water with a measured quantity of milk, and in the determination of the percentage of cream or butter in milk from the number of black lines visible on a conical-shaped stopper within a cylindrical glass vessel. In other words, Feser's lactroscope has a fixed quantity of milk, a fixed degree of transparency, and a varying quantity of water, and determines the percentage of fat by the amount of water added, while my butyroscope has a fixed quantity of milk, a fixed quantity of water, and a varying degree of transparency, and it determines the percentage of fat by the varying degree of transparency. The advantages of my apparatus are that the test can be made much more rapidly and with greater precision. I do not therefore claim, broadly, the combination of a cylindrical glass stopper with an internal gage to be observed through a mixture of milk and water; but What I do claim as my invention, and desire to secure by Letters Patent, is—

An instrument for testing milk, consisting of the glass vessel A, in combination with the conical stopper B, made of any non-transparent material, on which are drawn lines at regular intervals parallel to the circumference of its base forming a graduated scale, substantially as described.

ALBERT R. LEEDS.

Witnesses:
EDGAR EVERHART.
HENRY B. EVERHART.